3,005,782
GRANULAR POROUS MASS FOR AN ACETYLENE PRESSURE VESSEL AND THE PREPARATION THEREOF

John Arthur Tebboth, Morden, England, assignor to The British Oxygen Company Limited, a British company
No Drawing. Filed Apr. 12, 1960, Ser. No. 21,595
Claims priority, application Great Britain July 7, 1959
7 Claims. (Cl. 252—457)

This invention relates to porous material for use in vessels for the storage and handling of acetylene in solution.

When acetylene is stored or transported it is necessary to use a pressure vessel (which may be of the type commonly known as a cylinder) containing an inert porous mass and a solvent for acetylene which is usually acetone. The pressure vessel is charged with acetylene up to a maximum pressure which is governed by official regulations in each country; in Great Britain the maximum pressure allowed is 225 pounds per square inch gauge at 60° F.

The porous mass is needed for a variety of safety and practical considerations. Its function is to absorb the acetylene solution and to sub-divide the entire interior of the pressure vessel into small cells. Sometimes the porous mass is formed in situ in the pressure vessel and is a homogeneous medium with interconnected pores known as a "monolithic" mass. Alternatively a granular porous material may be compacted into a pressure vessel, the cells then being constituted partly by the intergranular spaces, i.e. the porosity due to the interstices between the granules (hereinafter referred to as the intergranular porosity), and partly by the porosity inherent in the porous granular material itself (hereinafter referred to as the inherent porosity). This subdivision of the interior of the pressure vessel into small cells prevents an acetylene decomposition (which may be initiated, for example, by backfire from external equipment attached to the pressure vessel, or in any other way) from spreading throughout the pressure vessel.

The term "inherent porosity" as used herein is defined by the formula: $P_i = 100(1 - d_a/d_t)$, where $P_i$ is the inherent porosity expressed as a percentage, $d_a$ is the apparent density of the material as determined by immersing a known weight of the material in mercury and measuring the displacement of the liquid and $d_t$ the true density of the material as similarly measured in acetone.

The term "intergranular porosity" as used herein is defined by the formula: $P_g = 100(1 - d_b/d_a)$, where $P_g$ is the intergranular porosity expressed as a percentage, $d_b$ is the bulk density of the porous material in the pressure vessel and $d_a$ is the apparent density of the material as measured in mercury.

The term "total porosity" as used herein is defined by the formula: $-P_t = 100(1 - d_b/d_t)$ where $P_t$ is the total porosity expressed as a percentage, $d_b$ is the bulk density of the porous material in the pressure vessel and $d_t$ is the true density of the material as measured in acetone.

The bulk density of the porous material is the mass of the material filling the pressure vessel divided by the water capacity of the vessel. It and the total porosity and intergranular porosity which depend on it, will vary with the degree of compaction of the mass in the vessel.

The densities $d_b$, $d_a$ and $d_t$, are determined after drying the material for 5 hours at 120° C.

The cell size of the intergranular porosity is normally markedly greater than that of the inherent porosity. It is desirable that the intergranular porosity should be kept as low as possible, consistent with ease of chargeability of the pressure vessel with acetylene. Other advantages obtained by the use of a porous mass are an increased acetylene charging rate resulting from the very great surface area presented by the mass, and a reduced loss of solvent during discharge by limiting entrainment of the solvent. It is found however that monolithic masses, which have virtually no intergranular porosity have in general a lower chargeability and also less satisfactory acetone retention.

The requirements of a satisfactory porous mass are as follows:

(1) Chemical stability: the mass must not react with acetylene, or with the solvent, or with the material of construction of the pressure vessel itself, nor must it catalyze any decomposition of the acetylene, or of the solvent, or any reaction between them; also, of course, it must itself be chemically stable over prolonged periods of time.

(2) High total porosity: for economic reasons the porous mass must not detract any more than is necessary from the capacity of the pressure vessel to hold solvent and acetylene; it must not add unduly to the total weight of the vessel or, in particular, to the ratio of this total weight to the quantity of acetylene carried in a full charge.

(3) Mechanical stability: during the course of handling in transport and use of the pressure vessel, the mass must not be liable to subsidence or the production of cracks, fissures, cavities, or regions of abnormally low density, whereby the efficiency of the mass might in time become impaired.

(4) Safety efficiency: the mass must resist the propagation of acetylene decomposition, either passed into the pressure vessel from equipment attached thereto, or initiated from the walls of the vessel by external heating whether of a localized or general character.

In addition to the above properties, it is desirable that the material should be of good mechanical strength, so that on drying, for example in a tumbler-drier, "fines" are produced only in small amounts. With the charcoal-containing granular materials commonly used at the present time, drying is not carried out in a tumbler-drier owing to the friability of dry charcoal, and such materials are dried in situ in the pressure vessel, which is a slow process. The monolithic type of mass has to be dried by even slower processes.

The granular, porous materials which have heretofore been used for filling acetylene pressure vessels include active charcoal, crushed insulating brick, calcium silicate, kapok and kieselguhr, and certain mixtures of these.

It is an object of the present invention to provide a granular porous mass for an acetylene pressure vessel which fulfills all the requirements previously stated, and which is not friable when dried. It is a further object to provide pressure vessels incorporating such a mass which will possess excellent acetylene chargeability and acetone retention.

According to the present invention, a granular porous mass for filling pressure vessels for the storage or transport of acetylene dissolved under pressure in a solvent comprises a mixture of 3–15% by weight of kieselguhr and 85–97% by weight of a granular meerschaum having an inherent porosity as hereinbefore defined of at least 75% and preferably at least 80%, the kieselguhr and meerschaum having been dried, preferably at about 120° C., either before or after mixing.

Meerschaum is a naturally-occuring mineral of composition $Mg_2Si_3O_8 \cdot nH_2O$, when $n$ is 1–4. It is sometimes known as "sepiolite."

Preferably, the mixture contains 5–10% of kieselguhr and 90–95% of the meerschaum.

It has been found that the addition of kieselguhr to the meerschaum causes a remarkable decrease in the intergranular porosity as compared with meerschaum alone, with only a small drop in total porosity, thus resulting in a remarkably large increase in the porosity derived from the inherent porosity of the material. This fact is unexpected, since the addition of up to 15% of kieselguhr to charcoal has been found to result in only a small decrease in intergranular porosity. Pressure vessels incorporating such a mixture of meerschaum and kieselguhr have been found to possess excellent resistance to acetylene decomposition.

It has been found that despite the reduction in intergranular porosity, the rate of charging of the pressure vessel with acetylene is greater for a mixture of meerschaum and kieselguhr in accordance with the invention then for the same pressure vessel filled with meerschaum alone, the comparison being made under strictly comparable conditions. In comparison with monolithic masses, the rate of charging is exceptionally rapid.

The material of the present invention can be pre-dried in a tumbler-type drier with very little mechanical size breakdown.

The invention is illustrated by the following example:

A sample of meerschaum of East African origin was dried at 120° C. and its apparent and true densities measured using mercury and acetone respectively. It was found to possess an inherent porosity of 81% and a pore volume of 1.6 ml. per gram. The bulk of the material was then ground in a slow-moving hammermill.

For use in preparing the porous mass, material mainly of 8–36 mesh B.S.S. but containing about 15% of finer material was taken. It was thoroughly mixed with kieselguhr in the proportions by weight of 95 parts of meerschaum to 5 parts of kieselguhr. The mixed material was then dried to constant weight (giving a weight loss of 13% and compacted into a steel pressure vessel having a water capacity of 1.8 cu. ft. At full compaction, 52 lbs. of the dried mixture was present in the pressure vessel.

The air in the vessel was then pumped out and 31 lb. of acetone added. On connecting the vessel to a line delivering acetylene at a pressure of 300 p.s.i.g., the vessel received 18.6 lb. of acetylene. The bulk of the acetylene was then discharged, under standardized conditions, leaving only the acetylene which is in equilibrium with acetone at ambient pressure. In the discharge, 10 oz. of acetone were lost.

Other tests made showed that the total porosity of the pressure vessel was 82.8%, of which 13.5% was intergranular porosity.

For the purposes of comparison, a similar pressure vessel, also of 1.8 cu. ft. water capacity, was filled with meerschaum of size 8 B.S.S. mesh to dust, the dry weight of the mass after compacting being 50½ lbs. The total porosity of the vessel was 83.4%, the intergranular porosity being 22.1%. This vessel was also charged with 31 lbs. of acetone and connected to the high pressure acetylene line under the same conditions as above when it took up 18.0 lb. of acetylene. Unlike the meerschaum/kieselguhr mixture, agitation of the vessel containing meerschaum alone caused a fall in pressure, showing that heterogeneous filling had taken place, the acetone present in the lower part of the vessel not having come into equilibrium with acetylene at the line pressure. The loss of acetone in the standardized discharge was 11 oz.

It will be noted that the acetylene/acetone ratio obtained using the meerschaum/kieselguhr mixture in accordance with the present invention is better than that obtained using meerschaum alone. The acetone loss is of the same order for both porous masses. The intergranular porosity of the meerschaum/kieselguhr mixture was, however, very much lower than that consisting of meerschaum alone, but unlike most monolithic masses, excellent acetylene chargeability and acetone retention have been retained.

What I claim is:

1. A granular porous mass for filling pressure vessels for the storage of acetylene dissolved under pressure in a solvent, consisting of a dry mixture of 3–15% by weight of kieselguhr and 85–97% by weight of a granular meerschaum having an inherent porosity of at least 75% as given by the formula:

$$P_i = 100(1 - d_a/d_t)$$

where $P_i$ is the inherent porosity expressed as a percentage, $d_a$ is the apparent density of the meerschaum as determined in mercury and $d_t$ is the true density of the meerschaum as determined in acetone.

2. A granular porous mass according to claim 1 wherein the inherent porosity of the meerschaum is at least 80%.

3. A granular mass according to claim 2 wherein the amount of kieselguhr is 5–10% by weight and that of the meerschaum is 90–95% by weight.

4. The method of manufacturing a granular porous mass for filling pressure vessels for the storage of acetylene dissolved under pressure in a solvent, comprising mixing from 3–15% by weight of kieselguhr with from 85–97% by weight of a granular meerschaum having an inherent porosity of at least 75% as given by the formula:

$$P_i = 100(1 - d_a/d_t)$$

where $P_i$ is the inherent porosity expressed as a percentage, $d_a$ is the apparent density of the meerschaum as determined in mercury, and $d_t$ is the true density of the meerschaum as determined in acetone, and drying the mixture so formed to constant weight.

5. The method according to claim 4 wherein said mixture is dried at about 120° C.

6. The method of manufacturing a granular porous mass for filling pressure vessels for the storage of acetylene dissolved under pressure in a solvent, which comprises separately drying to constant weight kieselguhr and a granular meerschaum having an inherent porosity of at least 75% as given by the equation:

$$P_i = 100(1 - d_a/d_t)$$

where $P_i$ is the inherent porosity expressed as a percentage, $d_a$ is the apparent density of the meerschaum as determined in mercury, and $d_t$ is the true density of the meerschaum as determined in acetone, and mixing from 3–15% by weight of the dry kieselguhr with from 85–97% by weight of the dry meerschaum.

7. The method according to claim 6 wherein the kieselguhr and the meerschaum are each dried at about 120° C.

References Cited in the file of this patent

UNITED STATES PATENTS

| 1,140,124 | Dalen | May 18, 1915 |
| 1,419,746 | Metzger | June 13, 1922 |
| 1,598,254 | Prutzman et al. | Aug. 31, 1926 |
| 1,623,169 | Dalen | Apr. 5, 1927 |